(12) United States Patent
Andersson et al.

(10) Patent No.: US 12,540,568 B2
(45) Date of Patent: Feb. 3, 2026

(54) METHOD FOR CONTROLLING THE OPERATION OF A HYDROGEN COMBUSTION ENGINE SYSTEM

(71) Applicant: VOLVO TRUCK CORPORATION, Gothenburg (SE)

(72) Inventors: Lennart Andersson, Skällinge (SE); Jonas Jansson, Hönö (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/875,390

(22) PCT Filed: Jul. 4, 2022

(86) PCT No.: PCT/EP2022/068438
§ 371 (c)(1),
(2) Date: Dec. 16, 2024

(87) PCT Pub. No.: WO2024/008269
PCT Pub. Date: Jan. 11, 2024

(65) Prior Publication Data
US 2025/0369380 A1    Dec. 4, 2025

(51) Int. Cl.
*F01N 3/20* (2006.01)
*F01N 3/28* (2006.01)
*F02B 47/02* (2006.01)

(52) U.S. Cl.
CPC ........... *F01N 3/2066* (2013.01); *F01N 3/208* (2013.01); *F01N 3/2803* (2013.01); *F02B 47/02* (2013.01);
(Continued)

(58) Field of Classification Search
CPC ........... F01N 2900/1602; F01N 3/2066; F01N 2370/04; F01N 3/208; F01N 9/00
See application file for complete search history.

(56) References Cited

U.S. PATENT DOCUMENTS 10,364,723 B2    7/2019    Raux
10,989,085 B1    4/2021    Jung
(Continued)

FOREIGN PATENT DOCUMENTS

DE    10128414 A1    12/2002
DE    10332047 A1    1/2005
(Continued)

OTHER PUBLICATIONS

International Search Report and Written Opinion of the International Searching Authority in corresponding International Application No. PCT/EP2022/068438 mailed Feb. 1, 2023 (16 pages).
(Continued)

*Primary Examiner* — Ngoc T Nguyen
(74) *Attorney, Agent, or Firm* — Jeffri A. Kaminski; Venable LLP

(57) ABSTRACT

A method for controlling the operation of a hydrogen combustion engine system of a vehicle. The hydrogen combustion engine system has a hydrogen combustion engine and an EATS to reduce emissions in the engine exhausts. The EATS has a selective catalyst reduction, SCR, catalyst and an ammonia slip catalyst, ASC, arranged downstream of the SCR catalyst. The method comprises: determining the temperature of the SCR catalyst; determining the temperature of the ASC; in response of determining that the temperature of the SCR catalyst is below a predetermined SCR temperature threshold value, and that the temperature of the ASC is below a predetermined ASC temperature threshold value, operating the hydrogen combustion engine in an H2 exhaust excess mode defined by an amount of unburnt H2 of at least 0.2 mol % in the engine exhausts, and using the unburnt H2 in the engine exhausts as a reductant for NOx conversion in the ASC.

12 Claims, 4 Drawing Sheets

(52) U.S. Cl.
CPC .... *F01N 2370/04* (2013.01); *F01N 2510/068* (2013.01); *F01N 2900/1602* (2013.01)

(56) References Cited

U.S. PATENT DOCUMENTS

| | | | | |
|---|---|---|---|---|
| 2012/0233986 | A1* | 9/2012 | Geveci | F01N 3/2066 60/287 |
| 2014/0331644 | A1* | 11/2014 | Kumar | F01N 3/103 60/297 |
| 2016/0186629 | A1* | 6/2016 | Osburn | G01M 15/102 60/276 |
| 2016/0298514 | A1 | 10/2016 | Raux | |

FOREIGN PATENT DOCUMENTS

| | | | |
|---|---|---|---|
| DE | 102020006451 | A1 | 3/2021 |
| DE | 102021003777 | A1 | 11/2021 |
| DE | 102021005095 | A1 | 4/2022 |
| EP | 1395351 | B1 | 11/2005 |
| EP | 3528929 | B1 | 8/2023 |
| WO | 2022000013 | A1 | 1/2022 |
| WO | 2022055852 | A1 | 3/2022 |

OTHER PUBLICATIONS

International Preliminary Report on Patentability in corresponding International Application No. PCT/EP2022/068438 mailed Dec. 21, 2023 (7 pages).
International Search Report and Written Opinion of the International Searching Authority in corresponding International Application No. PCT/EP2022/068442 mailed Mar. 3, 2023 (12 pages).
Notice of Allowance dated Oct. 1, 2025 in corresponding U.S. Appl. No. 18/876,061, 8 pages.

* cited by examiner

METHOD FOR CONTROLLING THE OPERATION OF A HYDROGEN COMBUSTION ENGINE SYSTEM

CROSS-REFERENCE TO RELATED APPLICATIONS

This application is a U.S. National Stage application of PCT/EP2022/068438, filed Jul. 4, 2022 and published on Nov. 11, 2024, as WO 2024/008269, all of which is hereby incorporated by reference in its entirety.

TECHNICAL FIELD

The present invention relates to a method for controlling the operation of a hydrogen combustion engine system of a vehicle, the hydrogen combustion engine system comprising a hydrogen combustion engine and an exhaust aftertreatment system, EATS, configured to reduce emissions of the engine exhausts. The invention further relates to a hydrogen combustion engine system of a vehicle, and to a vehicle comprising such engine system, as well as to a computer program and to a computer readable medium carrying a computer program.

The invention is applicable on vehicles, in particularly heavy vehicles, such as e.g. trucks. However, although the invention will mainly be described in relation to a truck, the hydrogen combustion engine system is also applicable for other types of vehicles, such as buses, passenger cars, industrial construction machines, wheel loaders, etcetera.

BACKGROUND

For many years, the demands on internal combustion engines have been steadily increasing and engines are continuously developed to meet the various demands from the market. Reduction of exhaust gases, increasing engine efficiency, i.e. reduced fuel consumption, and lower noise level from the engines are some of the criteria that are important aspects when choosing vehicle engine. Furthermore, in the field of trucks, there are applicable law directives that have e.g. determined the maximum amount of exhaust gas pollution allowable. Still further, a reduction of the overall cost of the vehicle is important and since the engine constitutes a relatively large portion of the total costs, it is desirable that also the costs of engine components are reduced.

In order to meet the described demands, various engine concepts have been developed throughout the years where conventional engine cylinders have been combined with e.g. a pre-compression stage and/or an expansion stage. Other engine concepts relates to the fuel used and combusted in the combustion engine. For example, gasoline and diesel can be exchanged to more environmentally friendly fuels, e.g. biofuels such as e.g. ethanol. In some cases, when exchanging the fuel, the combustion engine needs to be adapted to optimally operate on the new fuel. Lately, clean combustion engines, such as e.g. near zero emission combustion engines have become increasingly interesting. For example, by changing the fuel to hydrogen, or a hydrogen based fuel, the combustion of hydrogen with oxygen produces only water as biproduct (theoretically).

However, even though the engine is subject to adaptations in order to operate on the new fuel, NOx is typically formed during the high temperature combustion process, why cleaning of the engine exhausts is required. There is thus a need in the industry for engine system comprising an adapted exhaust aftertreatment system, EATS, to handle emissions from the hydrogen combustion engine. This in particularly important if the EATS is cold, e.g. during a cold-start of the combustion engine.

SUMMARY

It is an object of the present invention to at least partly alleviate the shortcomings discussed above in relation to known exhaust aftertreatment system, and to provide an improved system.

According to a first aspect of the present invention, a method for controlling the operation of a hydrogen combustion engine system of a vehicle, the hydrogen combustion engine system comprising a hydrogen combustion engine and an exhaust aftertreatment system, EATS, configured to reduce emissions in the engine exhausts, the EATS comprising a selective catalyst reduction, SCR, catalyst and an ammonia slip catalyst, ASC, arranged downstream of the SCR catalyst, is provided. The method comprises:

determining the temperature of the SCR catalyst;
determining the temperature of the ASC;
in response of determining that the temperature of the SCR catalyst is below a predetermined SCR temperature threshold value, and that the temperature of the ASC is below a predetermined ASC temperature threshold value, operating the hydrogen combustion engine in an H2 exhausts excess mode defined by an amount of unburnt H2 of at least 0.2 mol % in the engine exhausts, and using the unburnt H2 in the engine exhausts as a reductant for NOx conversion in the ASC.

Hereby, the NOx emissions in the engine exhausts can be reduced. That is, even though the temperature of the SCR catalyst is below the predetermined SCR temperature threshold value, implying that the NOx conversion capability of the SCR catalyst is low, the ASC may provide for additional conversion of NOx by using the unburnt H2 as a reductant in the ASC. In other words, if the temperature in the SCR catalyst is low (i.e. below the predetermined SCR temperature threshold value, typically below the normal operating temperature of the SCR catalyst), the ASC can be used, together with unburnt H2 in the engine exhausts, to reduce the NOx emissions from the hydrogen combustion engine. That is, as the SCR catalyst is not operating at full capacity, the ASC may be used together with unburnt H2 in the engine exhausts to facilitate in the reduction of NOx. Without by being bound by any theory, NO in the engine exhausts is catalytically converted into N2 (and N2O) in the ASC, wherein the unburnt H2 reacts with the surplus oxygen, and thereby facilitates the NOx conversion in the ASC. Moreover, by providing NOx conversion capabilities in both the SCR catalyst and the ASC, the reduction of NOx emissions can be achieved in an efficient manner. Thus, during operation of the EATS, NOx emissions are reduced of the engine exhausts.

It should be understood that the term "using" the unburnt H2 in the engine exhausts as a reductant from NOx conversion in the ASC implies that NOx is converted in the ASC using the unburnt H2 as a reductant in the NOx conversion. Thus, the method typically comprises such step of converting NOx of the engine exhausts in the ASC, wherein the unburnt H2 act as a reductant for the NOx conversion.

According to at least one example embodiment, the predetermined SCR temperature threshold value is defined as being lower than the normal operating temperature of the SCR catalyst, or even being lower than the working temperature of the SCR catalyst. As the temperature of the SCR catalyst is lower than its normal operating temperature, or lower than the working temperature of the SCR catalyst, the SCR catalyst is not operating at its full capacity. For example, the predetermined SCR temperature threshold value is set to a value between 200° C. and 250° C., e.g. to 200° C.

According to at least one example embodiment, the predetermined ASC temperature threshold value is set to a value between 200° C. and 250° C., e.g. to 250° C. Below such temperature, the H2 may act as a reductant in the NOx conversion, instead of being combusted by too high temperatures. However, it should be noted that at least a portion of the H2 (a minority) may still be combusted in the ASC.

According to at least one example embodiment, the H2 exhaust excess mode is comprised in a combustion mode of the hydrogen combustion engine. A combustion mode is a mode in which the engine cylinder(s) of the hydrogen combustion engine perform at least one combustion during an operating cycle. For example, in a four stroke cycle of the hydrogen combustion engine, four distinct piston strokes can be defined within the engine cylinder(s) to complete one operating cycle: intake, compression, power (combustion), and exhaust. In such example, the piston achieves two complete passes in the engine cylinder to complete one operating cycle. The hydrogen combustion engine may comprise one of more engine cylinders being configured to be operated in the same way. For example, each one of the engine cylinders may be configured to be operated according to the previously mentioned four stroke cycle.

According to at least one example embodiment, the H2 exhaust excess mode comprises operating the hydrogen combustion engine by injecting H2 in the engine cylinder during an exhaust stroke.

Hereby, H2 is injected into the engine cylinder(s) after combustion (as compared to the same operating cycle), and may thus be passed to the engine exhausts without being combusted, at least to reach an amount of unburnt H2 as defined above. For example, the H2 is injected into the engine cylinder(s) after the exhaust valve has opened, such as e.g. at least 10 crank angle degrees after the exhaust valve has opened. According to at least one example embodiment, the H2 is injected into the engine cylinder(s) between 90 crank angle degrees before TDC, and TDC, or between 130 crank angel degrees and 60 crank angle degrees before TDC. The exhaust stroke is typically an exhaust stroke in the above mentioned four stroke cycle in a combustion mode of the hydrogen combustion engine.

According to at least one example embodiment, the H2 exhaust excess mode is defined by an amount of unburnt H2 of at least 0.5 mol % in the engine exhausts.

Hereby, even more NOx can be converted in the ASC. According to at least one example embodiment, the amount of unburnt H2 is changed in the H2 exhaust excess mode from a lowest level of 0.2 mol % to a lowest level of 0.5 mol %. This may e.g. be performed in response to an increase in the torque demand, or in response to that the amount of NOx in the engine exhausts exceeds a NOx threshold value (of e.g. 1000 ppm). The amount of NOx may be defined in mol fraction, or be based on weight, e.g. as a weight-to-volume (W/V) concentration. Moreover, the amount of NOx may be determined per travelled distance, or per unit operational time or weight per energy, g/kWh. The H2 may be injected during the exhaust stroke in the engine cylinder(s) to reach an amount of unburnt H2 of at least 0.5 mol % in the engine exhausts.

According to at least one example embodiment, the H2 exhaust excess mode is defined by an amount of unburnt H2 of at most 4 mol %. Thus, the H2 exhaust excess mode may be defined by an amount of unburnt H2 of between 0.2 mol %, or 0.5 mol %, and 4 mol %.

It should be noted that by the expression "an amount of unburnt H2 of at least X mol %", is referring to the mole fraction of H2 in the exhaust gases (i.e. the mol percentage of H2 in the exhaust gases), and may simply be referred to as "an amount of H2 of at least X mol %".

According to at least one example embodiment, the H2 exhaust excess mode comprises operating the hydrogen combustion engine by injecting H2 in the engine cylinder during a compression stroke to reach a target lambda.

Hereby, combustion of H2 in the engine cylinder(s) is achieved.

Thus, and according to at least one example embodiment, H2 may be injected into the engine cylinder(s) at least twice during one operating cycle (e.g. the four stroke cycle previously described) by a primary H2 injection during the compression stroke, and a secondary H2 injection during the exhaust stroke. In a normal operating mode of the hydrogen combustion engine, such as a default combustion mode, only the primary H2 injection is utilized as there is no need for an excess of H2 in the engine exhausts. In the normal combustion mode, the amount of H2 in the engine exhausts is typically between 0.02 mol % and 0.15 mol %. Thus, the H2 exhaust excess mode may be distinguished from the default combustion mode by the secondary H2 injection, and may thus be referred to as an H2 secondary injection mode.

The target lambda refers to the target air-fuel equivalence ratio, and may be determined by the ratio of actual air-fuel ratio (mass of air to fuel) to stoichiometric air-fuel ratio, for a given mixture. According to at least one example embodiment, the target lambda is above 1, such as e.g. between 1.5 and 3. Hereby, the NOx in the engine exhausts can be kept low.

According to at least one example embodiment, the hydrogen combustion engine comprises a fuel injector for each engine cylinder for injecting H2 into the engine cylinder(s). According to at least one example embodiment, the fuel injector is used for both the primary H2 injection and the secondary H2 injection as described above. In other words, the method may comprise performing a primary H2 injection into the engine cylinder(s) during the compression stroke (to reach a target lambda) by the fuel injector, and performing a secondary H2 injection into the engine cylinder(s) during the exhaust stroke by said fuel injector. As an alternative embodiment, said fuel injector is a primary fuel injector configured to perform the primary H2 injection, wherein the hydrogen combustion engine further comprises a secondary fuel injector configured to perform the secondary H2 injection. In other words, the method may comprise performing a primary H2 injection into the engine cylinder(s) during the compression stroke (to reach a target lambda) by the primary fuel injector, and performing a secondary H2 injection into the engine cylinder(s) during the exhaust stroke by the secondary fuel injector. For example, the secondary fuel injector may be arranged to inject H2 in the engine cylinder closer to the exhaust valve as compared to the primary fuel injector.

As a further alternative, the secondary fuel injector may be arranged downstream of the exhaust valve of at least one of the engine cylinders in the hydrogen combustion engine. Thus, the secondary H2 injection may be performed outside of the engine cylinder(s) (and thus be made less dependent of the operating cycle of the engine cylinders), and directly into the engine exhausts in order to achieve an amount of unburnt H2 of at least 0.2 mol % in the engine exhausts. The secondary fuel injector may e.g. be arranged somewhere between downstream of the exhaust valve of at least one of the engine cylinders, and upstream of an inlet to the EATS, e.g. at the engine outlet or at an exhaust passage downstream of the exhaust valve. Thus, the secondary H2 injection may be achieved by injecting H2 into the engine exhausts somewhere between downstream of the exhaust valve of at least one of the engine cylinders, and upstream of an inlet to the EATS.

According to at least one example embodiment, the H2 exhaust excess mode comprises operating the hydrogen combustion engine by injecting H2 downstream of an exhaust valve of at least one of the engine cylinders in the hydrogen combustion engine.

Hereby, as mentioned above, the injection of H2 may be performed outside of the engine cylinder(s) and thus be made less dependent of the operating cycle of the engine cylinders, and directly into the engine exhausts in order to achieve an amount of unburnt H2 of at least 0.2 mol % in the engine exhausts. Moreover, by injecting H2 downstream of an exhaust valve of at least one of the engine cylinders in the hydrogen combustion engine, the H2 is less likely to be combusted by hot surfaces inside the hydrogen combustion engine.

According to at least one example embodiment, the hydrogen combustion engine system comprises an H2 storage tank comprising the H2 fuel (typically pressurized H2). For example, both the primary and secondary fuel injectors are configured to supply H2 from the H2 storage tank. That is, both the primary and secondary fuel injectors are configured to supply H2 fuel from the same H2 storage tank. For example, the method may comprise performing a primary H2 injection into the engine cylinder(s) during the compression stroke (to reach a target lambda) by the primary fuel injector utilizing H2 fuel from the H2 storage tank, and performing a secondary H2 injection to achieve an amount of unburnt H2 of at least 0.2 mol % in the engine exhausts by the secondary fuel injector utilizing H2 fuel from the (same) H2 storage tank. Thus, the unburnt H2 in the engine exhausts is originating from the H2 storage tank, and is not burned in the hydrogen combustion engine.

According to at least one example embodiment, the H2 exhausts excess mode comprises operating the hydrogen combustion engine by injecting water in the engine cylinder during an intake stroke.

This may be particularly advantageous at relatively low target lambda, e.g. lambda between 1.5 and 2, in order to reduce NOx in the engine exhausts.

According to at least one example embodiment, in response to receiving instruction to reduce target lambda to a predefined level (e.g. below 1.8), injecting H2 in the engine cylinder(s) during an exhaust stroke for at least five operating cycles of the engine cylinder(s), e.g. four stroke cycles as previously described, at a target lambda above the predefined level, prior to reducing the lambda to said predefined level. Hereby, unburnt H2 in the engine exhausts may be provided to the ASC prior to reaching an operation of the hydrogen combustion engine at the predefined level of target lambda. In other words, the EATS is prepared in advance of reaching the predefined level of the target lambda.

According to at least one example embodiment, the method further comprises:
transporting the unburnt H2 from an engine outlet of the hydrogen combustion engine to the ASC such that the mol fraction of the H2 in the exhaust gases reaching the ASC is at least 80% of that at the engine outlet.

Thus, most unburnt H2 from the engine outlet can be received by the ASC. For example at least a majority of the unburnt H2 from the engine outlet is received by the ASC. The unburnt H2 is typically transported from the engine outlet to the ASC by the exhaust gases in the EATS. A majority of the unburnt H2 is kept from being burned by that the temperature of the EATS from the engine outlet to the ASC is below a predetermined temperature, e.g. below 250° C.

It should be noted that the engine outlet and the exhaust gas inlet (or EATS inlet) are making up the interface between the hydrogen combustion engine and the EATS. Typically, the engine exhaust at the engine outlet continues as exhaust gases in the EATS downstream of the exhaust gas inlet. According to at least one example embodiment, the exhaust gas inlet defines the interface between the hydrogen combustion engine and the EATS. Thus, the exhaust gas inlet is the furthest upstream portion of the EATS, thus being an end-point of the EATS. Correspondingly, the engine outlet is the furthest downstream portion of the hydrogen combustion engine. The EATS typically comprise a fluid pathway for the exhaust gases received from the engine outlet of the hydrogen combustion engine, which extends from the exhaust gas inlet to an outlet of the EATS.

According to at least one example embodiment, the ASC is a monolith catalyst comprising an oxidation catalyst and a metal-zeolite coating, and the method comprises:
converting ammonia to NOx in the ASC using the oxidation catalyst; and
converting NOx to N2 in the ASC using the metal-zeolite.

The unburnt H2 in the exhaust gases reaching the ASC is used as a reductant for the NOx conversion, as previously described. The oxidation catalyst may e.g. be Pd, Pt or Rh, and the metal-zeolite may e.g. be Cu-zeo or Fe-zeo. The metal-zeolite may e.g. be arranged on top of the oxidation catalyst. The conversion of NOx to N2 using the metal-zeolite is typically facilitated by ammonia present in the exhaust gases. The oxidation catalyst and/or the metal-zeolite may be applied to the monolith by a corresponding powder coating. According to at least one example embodiment, the monolith may be a flow through monolith or a wall-flow monolith. The monolith of the ASC may be referred to as a monolith substrate, and may e.g. be a ceramic monolith.

Thus, the ASC is configured to reduce emission by ammonia oxidation and NOx conversion. In use, ammonia enters the ASC with the exhaust gases, and is at least partially oxidized to NO (or NOx). The oxidized NO and ammonia inside the ASC, not yet oxidized, consequently react to N2 by catalytic conversion using the metal-zeolite (i.e. following the usual SCR reaction schemes).

According to at least one example embodiment, the method is performed during a cold start of the hydrogen combustion engine.

Thus, in response to a cold start of the hydrogen combustion engine, the method of the first aspect of the invention is carried out. For example, during initial operation of vehicle, or at least during initial operation of the hydrogen combustion engine, e.g. up to a point in time at which the (normal) operating temperature of the hydrogen combustion engine system has been reached, or that the normal operating temperature of the EATS has been reached, the emissions, e.g. emissions per travelled distance, or emissions per unit operational time or emission per energy (g/kWh) out of the EATS are typically higher compared to when the operating temperature of the EATS has been reached. Such emissions are referred to as cold-start emissions and they typically comprises undesired compounds (such as NOx) at an unsatisfactory amount in the exhaust out from the EATS as a result of the cold-start of the hydrogen combustion engine system. The initial operation of the vehicle, or the initial operation of the hydrogen combustion engine, may e.g. span over the near future of the start-up of the hydrogen combustion engine, e.g. over a time span of e.g. 0 s or 1 s to 30 min, or 0 s or 1 s to 20 min, or 0 s or 1 s to 15 min, or 0 s or 1 s to 10 min. Thus, the cold-start emissions of the hydrogen combustion engine system are the emissions (e.g. NOx) in the exhausts out from the EATS during such initial operation of the hydrogen combustion engine. However, there are also other vehicle operational conditions for which the operating temperature (or normal operating temperature) of the hydrogen combustion engine system, or at least the operating temperature of the EATS or SCR catalyst, is not achieved. Such vehicle operational conditions may also lead to elevated, or at least unnecessarily high, emissions out of the EATS. The normal operating temperature of the EATS may e.g. be considered met when the normal operating temperature of the SCR catalyst has been reached. According to at least one example embodiment, the normal operating temperature of the EATS is defined by that the temperature of the SCR catalyst is above the predetermined SCR temperature threshold value. According to at least one example embodiment, the normal operating temperature of the EATS is defined by that the temperature of the SCR catalyst is above the predetermined SCR temperature threshold value, and that the temperature of the ASC is above the predetermined ASC temperature threshold value. As previously mentioned, each one of the predetermined SCR temperature threshold value and the predetermined ASC temperature threshold value may be value of between 200° C. and 250° C.

According to a second aspect of the present invention, a hydrogen combustion engine system is provided. The hydrogen combustion engine system comprises a hydrogen combustion engine and an exhaust aftertreatment system, EATS, configured to reduce emissions in the engine exhausts, the EATS comprising a selective catalyst reduction, SCR, catalyst and an ammonia slip catalyst, ASC, arranged downstream of the SCR catalyst, wherein the hydrogen combustion engine system comprises a control unit configured to:
  determine the temperature of the SCR catalyst;
  determine the temperature of the ASC;
  in response of determining that the temperature of the SCR catalyst is below a predetermined SCR temperature threshold value, and that the temperature of the ASC is below a predetermined ASC temperature threshold value, instruct the hydrogen combustion engine to operate in an H2 exhaust excess mode defined by an amount of unburnt H2 of at least 0.2 mol % in the engine exhausts for using the unburnt H2 in the engine exhausts as a reductant for NOx conversion in the ASC.

Effects and features of the second aspect of the invention are largely analogous to those described above in connection with the first aspect of the invention. Embodiments mentioned in relation to the first aspect of the invention are largely compatible with the second aspect of the invention, of which some are exemplified below.

According to at least one example embodiment, the control unit is configured to cause the hydrogen combustion engine system to execute the steps of the method of the first aspect of the invention.

According to at least one example embodiment, the hydrogen combustion engine is configured to be operated by an Otto cycle.

According to at least one example embodiment, the hydrogen combustion engine is an internal combustion engine configured to combust hydrogen in one ore more engine cylinders of the engine. The engine cylinder(s) referred to throughout the application text may be referred to as combustion cylinder(s). It should be understood that when referring to the configuration or operation of an/the engine cylinder in the application text, the configuration or operation is referring to at least one of the engine cylinders, or all of the engine cylinders, of the hydrogen combustion engine.

For example, the hydrogen combustion engine is configured to be operated by four-stroke combustion in the engine cylinder(s). Typically, the hydrogen combustion engine is configured to be operated by a lambda of between 1.5 and 3.

For example, the hydrogen combustion engine system comprises a transportation pipe defining a fluid pathway for transporting the exhaust gases from an exhaust gas inlet of the EATS to an EATS outlet. Thus, unburnt H2 from the engine exhausts may be transported to the ASC and there be used as a reductant for NOx conversion. According to at least one example embodiment, the EATS is free of any oxidation catalyst arranged downstream of the exhaust gas inlet and upstream of the ASC. Thus, typically, the transportation pipe defining the fluid pathway is free of any oxidation catalyst.

Hereby, the unburnt H2 from the engine exhausts can more easily reach the ASC without being combusted.

According to a third aspect of the invention, a vehicle comprising a hydrogen combustion engine system according to the second aspect of the invention is provided.

According to a fourth aspect of the invention, a computer program comprising program code means comprising instructions to cause the hydrogen combustion engine system of the second aspect of the invention to execute the steps of the method of the first aspect of the invention, when said program is run on a computer is provided.

According to a fifth aspect of the invention, a computer readable medium carrying a computer program comprising program code means comprising instructions to cause the hydrogen combustion engine system of the second aspect of the invention to execute the steps of the method of the first aspect of the invention, when said computer program is run on a computer is provided.

Effects and features of the third to fifth aspects of the invention are largely analogous to those described above in connection with the first and second aspects of the invention. Embodiments mentioned in relation to the first and second aspects of the invention are largely compatible with the third to fifth aspects of the invention.

It should be understood that the SCR catalyst and the ASC form different emission reducing modules in the EATS. For example, each emission reducing module may comprise a container or canister housing the emission reducing components, such as various catalysts and substrates.

According to at least one example embodiment, applicable to any one of the first to fifth aspects of the invention, the EATS further comprises at least one particulate filter. The particulate filter may be arranged between the SCR catalyst and the ASC, or downstream of the ASC. According to at least one example embodiment, the particulate filter is integrated with the SCR catalyst (i.e. housed in the same container or canister) and is arranged upstream of the SCR catalyst.

According to at least one example embodiment, applicable to any one of the first to fifth aspects of the invention, the EATS further comprises:

an injector configured to inject a reductant for providing ammonia to the SCR catalyst, wherein the injector is arranged upstream of the SCR catalyst, and downstream of the exhaust gas inlet.

Hereby, during operation of the EATS, reductant is injected upstream the SCR catalyst. Thus, the flow of exhaust gases through the EATS transports the injected reductant to the SCR catalyst. The injector may be arranged anywhere between the exhaust gas inlet and the SCR catalyst. The reductant used by the injector may be at least one of the following: anhydrous ammonia, aqueous ammonia, urea, aqueous urea and a diesel exhaust fluid. According to at least one example embodiment, the reductant is urea or liquid urea. As previously mentioned, the ASC is configured to handle the excess ammonia which is not utilized in the SCR catalyst.

According to at least one example embodiment, applicable to any one of the first to fifth aspects of the invention, the SCR catalyst is a metal-zeolite SCR catalyst, e.g. Cu-zeo or Fe-zeo. As an alternative, the SCR catalyst may comprise a Vanadia-based coating. The SCR catalyst is thus configured to convert nitrogen oxides, NOx, with the aid of the SCR catalyst coating (i.e. the metal-zeolite or the Vanadia-based coating) into diatomic nitrogen, N, and water. During operation of the EATS, the injected reductant (or the resulting ammonia) is reacted onto the SCR catalyst coating. The SCR catalyst coating may be applied to the substrate of the SCR catalyst by means of a washcoat, i.e. be applied to the substrate by means of an aqueous slurry, dried and calcined. Hereby, application of the SCR catalyst coating in the substrate is facilitated. As an alternative, the SCR catalyst coating may be applied by means of a powder coating. The substrate of the SCR catalyst may be a monolith, such as a ceramic monolith.

According to at least one example embodiment, applicable to any one of the first to fifth aspects of the invention, the hydrogen combustion engine system further comprises various sensors at various locations in the EATS known to the skilled person. For example NOx sensors may be located at, or proximate, the exhaust gas inlet and/or outlet of the EATS. Moreover, temperature sensors, and/or pressure sensors, may be located before and/or after any one of the emission reducing modules, such as the SCR catalyst and the ASC. Furthermore, the hydrogen combustion engine system may comprise one or more sensors for measuring the amount of H2 in the hydrogen combustion engine system. For example, an H2 sensor may be arranged at the engine outlet for measuring the amount of H2 in the engine exhausts. Additionally or alternatively, an H2 sensor may be arranged upstream of the ASC for measuring the amount of H2 in the exhaust gases entering the ASC. The hydrogen combustion engine system may further comprise a controller configured to control e.g. the introduction of reductant into the fluid pathway of the exhaust gases.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
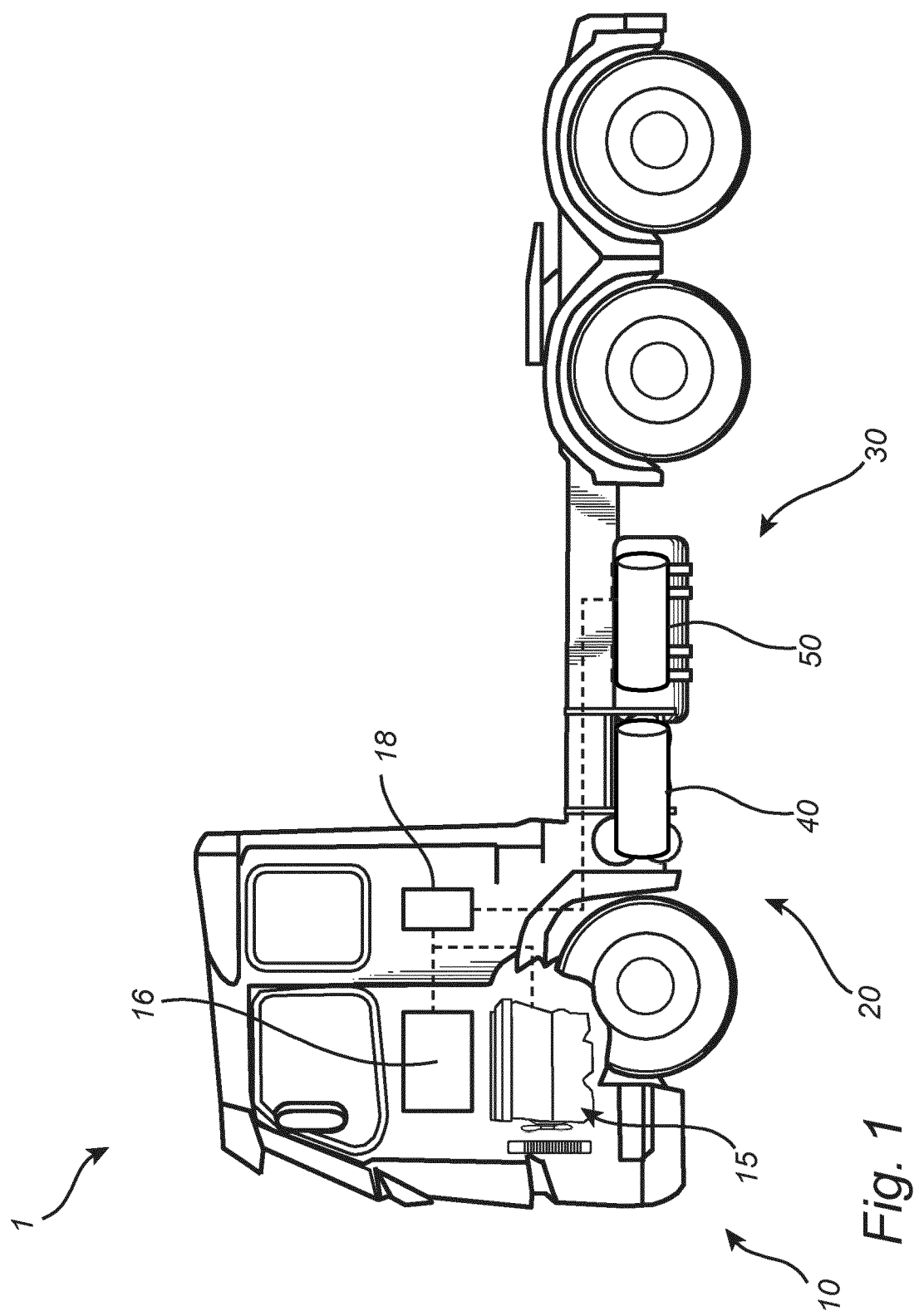
FIG. 1 is a schematic side view of a vehicle comprising a hydrogen combustion engine system, and an exhaust aftertreatment system of the hydrogen combustion engine system, in accordance with an example embodiment of the invention.

With reference to FIG. 1 a vehicle 1, here embodied as a heavy duty truck 1, is shown for which a hydrogen combustion engine system 10 of a kind disclosed in the present disclosure is advantageous. However, the hydrogen combustion engine system 10 may as well be implemented in other types of vehicles, such as in busses, light-weight trucks, passenger cars, marine applications etc. The hydrogen combustion engine system 10 of the vehicle 1 of FIG. 1 comprises a hydrogen combustion engine 15 and an exhaust aftertreatment system, EATS, 20 configured to reduce emission of the engine exhausts from the hydrogen combustion engine 15. However, the vehicle may according to at least one example embodiment be a hybrid vehicle further comprising an electric machine or fuel cell 16 (optional). The hydrogen combustion engine 15 is powered by hydrogen fuel (also referred to as H2 fuel), typically comprised in a fuel tank (also referred to as H2 storage tank), and any electric machine is typically powered by electricity supplied from at least one energy storage or transformation device, e.g. a battery (not shown) or a fuel cell, while any fuel cell is typically powered by hydrogen fuel, e.g. from said fuel tank. The hydrogen combustion engine 15 is preferably configured to be operated by an Otto cycle, or another four stroke cycle. The operation of the hydrogen combustion engine system 10 may e.g. be controlled by a control unit 18.

In FIG. 1, the EATS 20 comprises a plurality of emission reducing modules 30 arranged downstream of an exhaust gas inlet (shown in FIG. 2) of the EATS 20. The emission reducing modules 30 are configured to reduce emissions of the engine exhausts. The plurality of emission reducing modules 30 comprises at least a first emission reducing module 40, here being a selective catalyst reduction, SCR catalyst 40, and a second reducing module 50, here being an ammonia slip catalyst, ASC. In FIG. 1, the SCR catalyst 40 is arranged upstream of the ASC 50. The SCR catalyst 40 is configured to convert nitrogen oxides, also referred to as NOx, with the aid of a SCR catalyst coating, into diatomic nitrogen, N2, and water, and the ASC 50 is configured to reduce emission by ammonia oxidation and NOx conversion, as will be described with reference to FIG. 2. The EATS 20 typically comprise further components such as e.g. piping and may comprise additional emission reducing components (not shown in FIG. 1).

Figure 2:
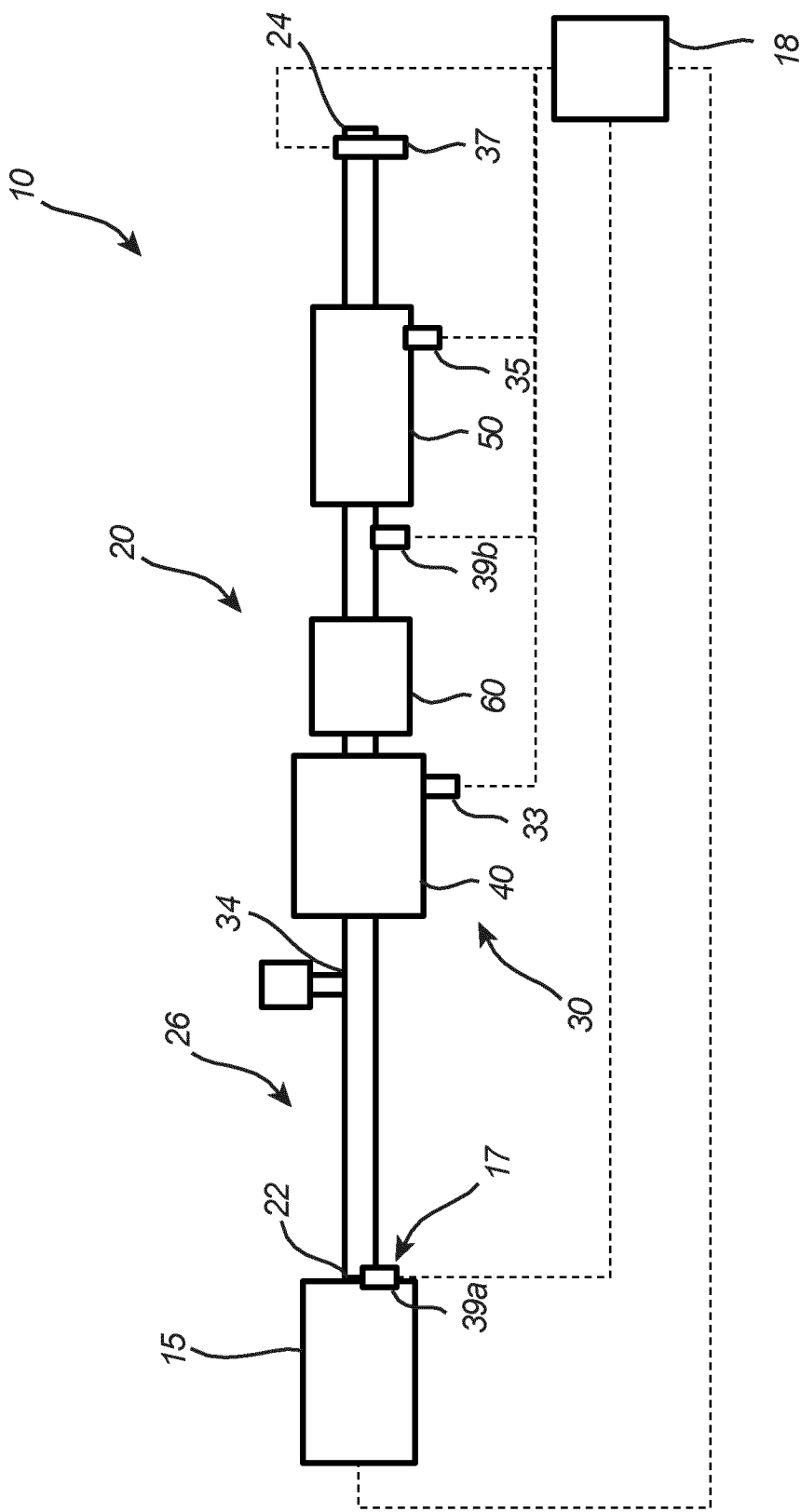
FIG. 2 is a schematic view of a hydrogen combustion engine system, and an exhaust aftertreatment system of the hydrogen combustion engine system, of a vehicle in accordance with example embodiments of the invention.

In FIG. 2, the hydrogen combustion engine system 10 of FIG. 1 is shown in greater detail. Thus, the hydrogen combustion engine system 10 comprises the hydrogen combustion engine 15 and the exhaust aftertreatment system, EATS, 20 configured to reduce emissions of the engine exhausts, described briefly with reference to FIG. 1. The engine exhaust entering the EATS is in the following referred to as exhaust gases.

The EATS 20 comprises an exhaust gas inlet 22 for receiving engine exhaust from an engine outlet 17 of the hydrogen combustion engine 15, an EATS outlet 24 for discharging at least partly cleaned exhaust gases from the EATS 20, and a fluid pathway 26 for transporting the exhaust gases from the exhaust gas inlet 22 to the EATS outlet 24. The EATS outlet 24 may e.g. be connected to, or comprise, the tailpipe of the vehicle 1. The EATS 20 further comprises a plurality of emission reducing modules 30 arranged downstream of the exhaust gas inlet 22. The emission reducing modules 30 are configured to reduce emissions of the engine exhausts along the fluid pathway 26. In the embodiment of FIG. 2, the plurality of emission reducing modules 30 is composed of the previously mentioned first emission reducing module being a selective catalyst reduction, SCR catalyst 40, and the previously mentioned second reducing module being an ammonia slip catalyst, ASC, 50. The ASC 50 is arranged downstream of the SCR catalyst 40. Moreover, in the embodiment of FIG. 2, an optional third emission reducing module 60, here being a particulate filter, is arranged in between the SCR catalyst 40 and the ASC 50.

The SCR catalyst 40 preferably comprises an SCR catalyst coating being a metal-zeolite SCR catalyst, e.g. Cu-zeo or Fe-zeo. As an alternative, the SCR catalyst coating is a Vanadia-based coating. The SCR catalyst 40 is designed to convert nitrogen oxides, NOx, with the aid of the SCR catalyst coating into diatomic nitrogen, N, and water. The SCR catalyst 40 typically comprises a substrate, e.g. a monolith, onto which the SCR catalyst coating is arranged.

The ASC 50 preferably comprises an oxidation catalyst and metal-zeolite. That is, the ASC 50 preferably comprises a first ASC coating being an oxidation catalyst and comprises a second ASC coating being a metal-zeolite (i.e. having SCR catalyst functionality) The ASC 50 is designed to convert ammonia to NOx with the aid of the oxidation catalyst, and to convert NOx to N2 with the aid of the metal-zeolite. The ASC 50 typically comprises a substrate, e.g. a monolith, onto which the first and second ASC coatings are arranged.

The particulate filter 60 is configured to remove particles, e.g. particulate emissions or soot, from the exhaust gases. The particulate filter 60 is in the embodiment of FIG. 2 arranged in between the SCR catalyst 40 and the ASC 50, but may according to an alternative example embodiment be arranged upstream of the SCR catalyst 40. In such embodiment, particulate emissions, such as e.g. sulphur containing emissions, is filtered from the exhaust gases upstream of the SCR catalyst 40, thereby reducing the deterioration of the downstream arranged SCR catalyst coating.

Moreover, in order to provide ammonia to the SCR catalyst 40, and the ASC 50, the EATS 20 comprises an injector 34 configured to inject a reductant to the fluid pathway 26 upstream of the SCR catalyst 40, and downstream of the exhaust gas inlet 22. The reductant may e.g. be urea. Thus, the injector 34 may be configured to inject urea. During operation of the EATS 20, the injected reductant (or the resulting ammonia) is transported to the SCR catalyst 40 by means of the exhaust gases, and is reacted onto the SCR catalyst coating. Reductant, or ammonia, which passes the SCR catalyst 40 unreacted is handled in the ASC 50 as previously described.

The EATS 20 of the hydrogen combustion engine system 10 of FIG. 2 is typically operated in the following manner: engine exhausts, or exhaust gases (to be cleaned) from the hydrogen combustion engine 15, leave the engine outlet 17 and enter the EATS 20 via the exhaust gas inlet 22, and encounters the SCR catalyst 40. Upstream of the SCR catalyst 40 and downstream of the exhaust gas inlet 22, reductant is injected via the injector 34. The injected reductant is thus mixed with the exhaust gases. Typically, the reductant is evaporated and hydrolysed into ammonia (by a heater or by being heated by the exhaust gases). In the SCR catalyst 40, catalytic reduction of NOx in the exhaust gases is performed by the aid ammonia and the SCR catalyst coating. Thereafter, the exhaust gases passes through the particulate filter 60 (which is optional). whereafter the at least partly cleaned exhaust gases encounter the ASC 50. In the ASC 50, emissions are further reduced by ammonia oxidation and NOx conversion, whereafter the exhaust gases are discharged from the EATS 20 via the EATS outlet 24.

As also shown in FIG. 2, the EATS 20 may comprise means for providing determination/measurement of various parameters, such as e.g. the temperature of the SCR catalyst 40 and/or the ASC 50 by means of temperature sensors 33, 35. Moreover, the amount of NOx may be determined/measured at the EATS outlet 24 by means of a NOx sensor 37, e.g. the molar fraction of NOx, or weight of NOx per travelled distance, weight per unit operational time or weight per energy (g/kWh). In the embodiment of FIG. 2, a first temperature sensor 33 is arranged to directly measure the temperature of the SCR catalyst 40, and a second temperature sensor 35 is arranged to directly measure the temperature of the ASC 50. Note, however, that the temperature SCR catalyst 40 may be determined by an estimation using at least one temperature sensor arranged upstream and/or downstream of the SCR catalyst 40, and/or that the temperature of the ASC 50 may be determined by an estimation using at least one temperature sensor arranged upstream and/or downstream of the ASC 50, e.g. a temperature sensor arranged at the EATS outlet 24.

Furthermore, the hydrogen combustion engine system 10 may comprise one or more sensors for measuring the amount of H2 in the hydrogen combustion engine system 10. For example, as shown in the example embodiment of FIG. 2, a first H2 sensor 39a is arranged at the engine outlet 17 for measuring the amount of H2 in the engine exhausts, and a second H2 sensor 39b is arranged upstream of the ASC 50 for measuring the amount of H2 in the exhaust gases entering the ASC 50. The operation of the hydrogen combustion engine system 10 may as previously described be controlled by a control unit 18.

Figure 3A:
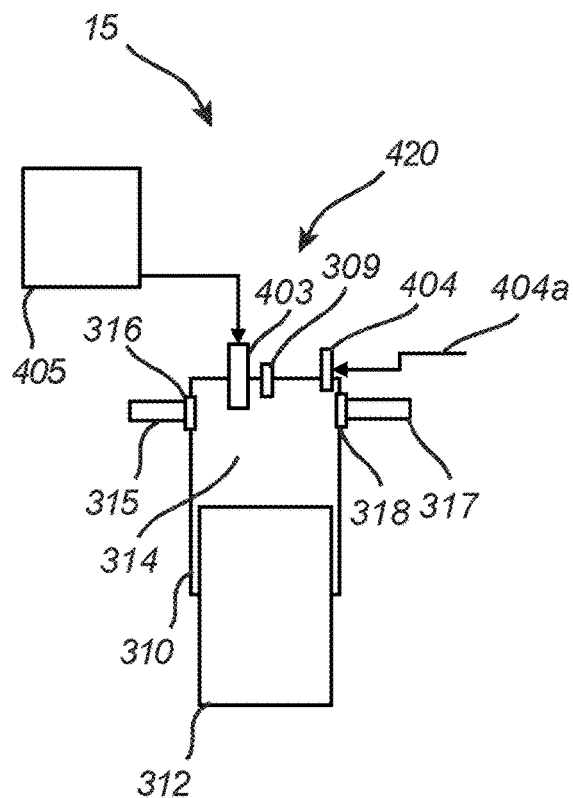
FIG. 3A is a schematic view of at least parts of a hydrogen combustion engine according to an example embodiment of the present invention.

An example embodiment of the configuration of the hydrogen combustion engine 15 and the operation thereof will now be described in more detail with reference to FIG. 3A. FIG. 3A schematically shows an engine cylinder (or combustion cylinder) 310 housing a piston 312, of the hydrogen combustion engine 15. Typically, a plurality of such engine cylinders and corresponding pistons is comprised in the hydrogen combustion engine 15. In more detail, the piston 312 is configured for reciprocal movement within the engine cylinder 310, wherein a combustion chamber 314 is comprised in the engine cylinder 310 above the piston 312. The hydrogen combustion engine 15 further comprising a spark plug 309 arranged in the combustion chamber 314. The piston 312 may be a dual acting piston in which the engine cylinder 310 is a combustion cylinder, and the hydrogen combustion engine 15 further comprises a compressor cylinder (not shown).

The hydrogen combustion engine 15 comprises an air intake passage 315 being arranged downstream of e.g. an air chamber fluidly connected to a compressor (not shown). Air, or compressed air, is fed to the combustion chamber 314 via the intake passage 315, and is regulated by an intake valve 316. Moreover, the hydrogen combustion engine 15 comprises an exhaust passage 317 regulated by an exhaust valve 318.

As can be seen in FIG. 3A, the hydrogen combustion engine 15 comprises an injection system 420 comprising a fuel injector 403 configured to supply H2 (typically as a gaseous fuel) to the combustion chamber 314. The fuel injector 403 is fluidly connected to at least one H2 storage tank 405 comprising pressurized H2 fuel or a hydrogen based gas (or a fuel which easily can conform to form hydrogen). The injection system 420 may further comprise a water inlet arrangement 404 configured for supplying a water based fluid medium 404a to the combustion chamber 314.

The hydrogen combustion engine 15 may be operated according to an Otto cycle or another four stroke combustion mode. The four stroke cycle of the hydrogen combustion engine thus comprises four distinct piston strokes within the engine cylinder 310 to complete one operating cycle: intake of air or compressed air via the air intake passage 315 and the intake vale 316 as the piston 312 moves reciprocally away from TDC, compression as the piston 312 moves reciprocally towards TDC, power or combustion as the H2 fuel is combusted using the spark plug 309, and exhaust in which the engine exhausts leaves the combustion chamber 314 via the exhaust passage 317 and the exhaust valve 318.

Figure 4:
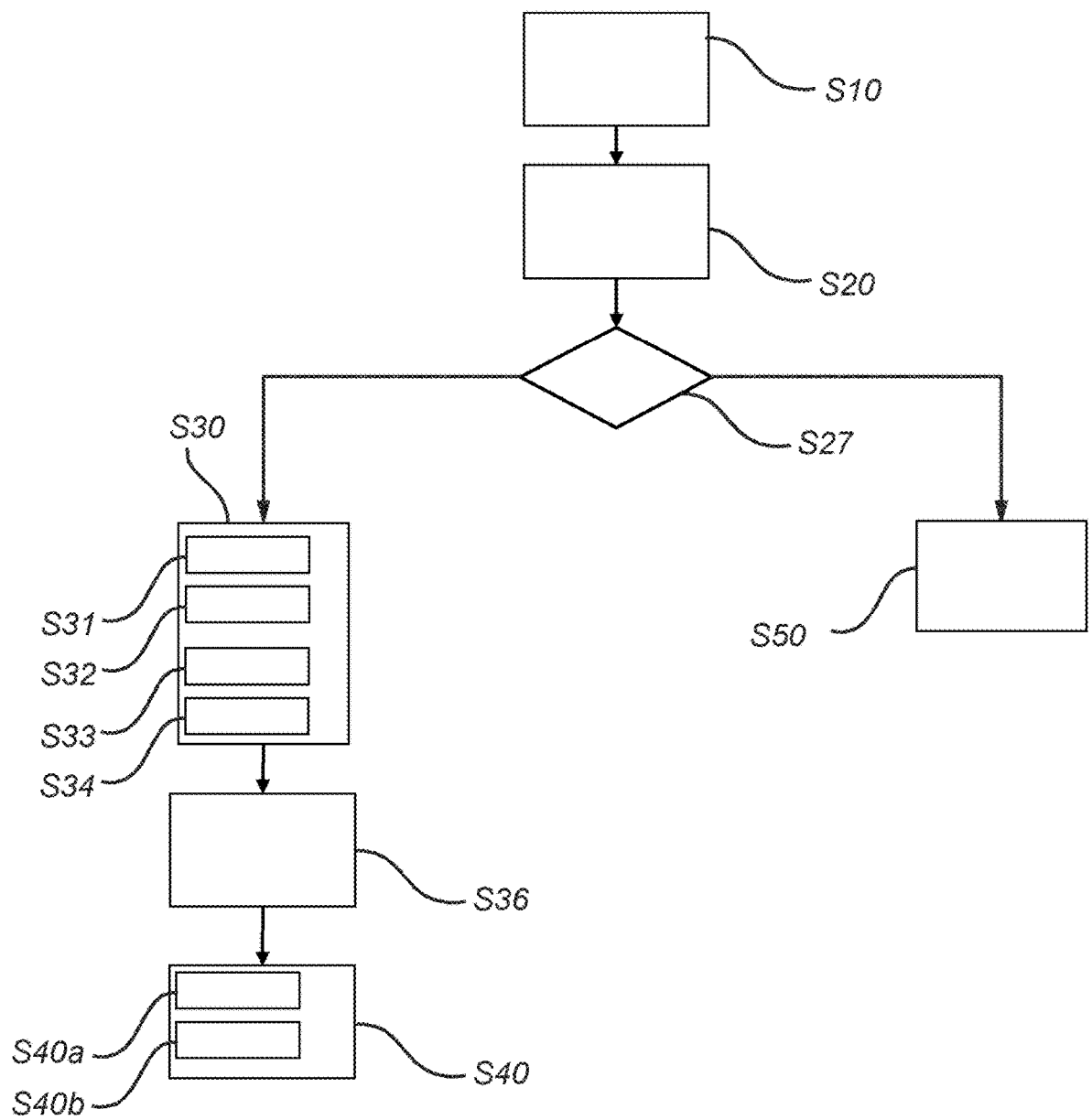
FIG. 4 is a flowchart illustrating the steps of a method in accordance with example embodiments of the invention.

A method for controlling the operation of a hydrogen combustion engine system of a vehicle will now be described with reference to the flowchart of FIG. 4, schematically illustrating steps of such method. Furthermore, reference is made to the hydrogen combustion engine system 10 of FIGS. 1 and 2, and the hydrogen combustion engine 15 shown in FIG. 3A. Thus, the hydrogen combustion engine system 10 applicable to the method comprises at least a selective catalyst reduction, SCR, catalyst 40 and an ammonia slip catalyst, ASC, 50 arranged downstream of the SCR catalyst 40. The method described with reference to the flowchart of FIG. 4 may e.g. be performed in response to, or during, a cold start of the hydrogen combustion engine 15.

In a step S10, e.g. being a first step S10, the temperature of the SCR catalyst 40 is determined. For example, the temperature of the SCR catalyst 40 may be determined based on a temperature measurement. This may e.g. be achieved by measuring the temperature of the SCR catalyst 40 using a temperature sensor (as described with reference to FIG. 2) or estimating the temperature of the SCR catalyst 40 using temperature sensor(s) arranged upstream and/or downstream of the SCR catalyst 40. The temperature of the SCR catalyst 40 may alternatively be determined by modelling the temperature of the EATS 20 in response to a known thermal model of the EATS.

In a step S20, e.g. being a second step S20, which may be performed prior to, simultaneously with, or subsequently to the step S10, the temperature of the ASC 50 is determined. For example, the temperature of the ASC 50 may be determined based on a temperature measurement. This may e.g. be achieved by measuring the temperature of the ASC 50 using a temperature sensor (as described with reference to FIG. 2) or estimating the temperature of the ASC 50 using temperature sensor(s) arranged upstream and/or downstream of the ASC 50. The temperature of the ASC 50 may alternatively be determined by modelling the temperature of the EATS 20 in response to a known thermal model of the EATS.

In a step S27, performed subsequently to at least steps S10 and S20, the determined temperature of the SCR catalyst 40 is compared to a predetermined SCR temperature threshold value, and the determined temperature of the ASC 50 is compared to a predetermined ASC temperature threshold value. For example, the predetermined SCR temperature threshold value is set to a value between 200° C. and 250° C., e.g. to 200° C., and the predetermined ASC temperature threshold value is set to a value between 200° C. and 250° C., e.g. to 250° C.

In response of an outcome of step S27 being that the temperature of the SCR catalyst 40 is below the predetermined SCR temperature threshold value, and that the temperature of the ASC 50 is below the predetermined ASC temperature threshold value, the hydrogen combustion engine 15 is operated in an H2 exhaust excess mode in a step S30, and the unburnt H2 in the engine exhausts is used as a reductant for NOx conversion in the ASC 50 in a step S40. The H2 exhaust excess mode is defined by an amount of unburnt H2 of at least 0.2 mol %, or at least 0.5 mol %, in the engine exhausts.

In a step 31, the hydrogen combustion engine 15 is operated by injecting H2 in the engine cylinder 310 during an exhaust stroke of the piston 312. Typically, the H2 exhaust excess mode is comprised in a combustion mode of the hydrogen combustion engine, such as the previously described four stroke combustion mode, wherein the exhaust stroke is the exhaust stroke of the four stroke cycle previously described. Hereby, H2 is injected into the engine cylinder 310 after combustion, and may thus be passed to the engine exhausts via the exhaust passage 317 without being combusted, at least to reach an excess of unburnt H2 as defined above. For example, the H2 is injected into the engine cylinder 310 and the combustion chamber 314 after the exhaust valve 318 has opened, such as e.g. at least 10 crank angle degrees after the exhaust valve 318 has opened. Additionally or alternatively, H2 is injected into the engine cylinder 310 and the combustion chamber 314 between 90 crank angle degrees before TDC, and TDC.

In a step S32, the hydrogen combustion engine 15 is operated by injecting H2 in the engine cylinder 310 during a compression stroke of the piston 312 to reach a target lambda. Hereby, combustion of H2 in the engine cylinder 310 and the combustion chamber 314 is achieved. The target lambda is typically above 1, such as e.g. between 1.5 and 3. It should be noted that the order of steps S31 and S32 may be reversed, and/or cycled.

As evident by steps S31 and S32, H2 may be injected into the engine cylinder 310 at least twice during one operating cycle (e.g. the four stroke cycle previously described) by a primary H2 injection during the compression stroke in step S32, and a secondary H2 injection during the exhaust stroke in step S31.

As shown in FIG. 3A, the same fuel injector 403 may be used for both the primary H2 injection and the secondary H2 injection. In other words, both steps S31 and S32 may be achieved by the fuel injector 403.

Figure 3B:
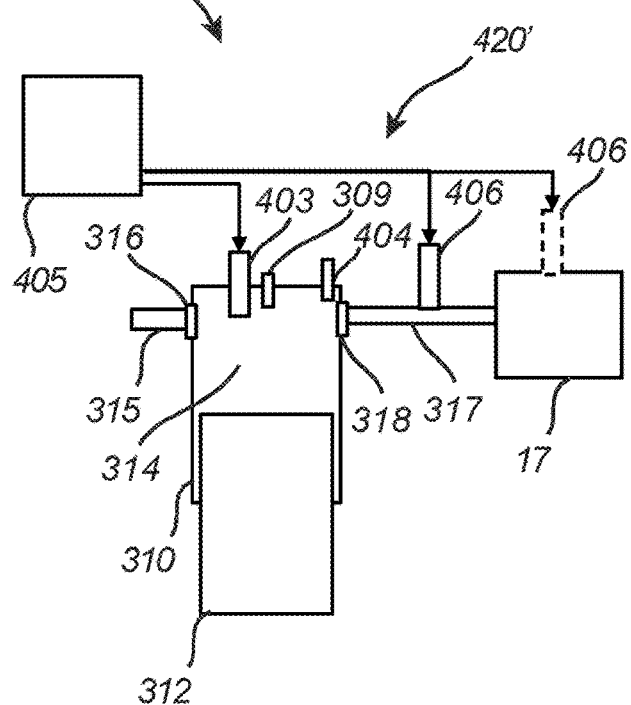
FIG. 3B is a schematic view of at least parts of a hydrogen combustion engine according to yet another example embodiment of the present invention.

A further alternative is shown in FIG. 3B. FIG. 3B is schematic illustration of the same engine cylinder 310 and piston 312 as in FIG. 3A, why the same reference numerals are used for indicating the same or corresponding features. In the hydrogen combustion engine 15' of FIG. 3B, the fuel injector 403 also shown in FIG. 3A is a primary fuel injector 403 configured to perform the primary H2 injection. Moreover, the hydrogen combustion engine 15' comprises a secondary fuel injector 406 configured to perform the secondary H2 injection. As shown in FIG. 3B, the secondary fuel injector 406 may be arranged downstream of the exhaust valve 318 of the engine cylinder 310. Thus, the secondary H2 injection may be performed outside of the engine cylinder 310 (and thus be made less dependent of the operating cycle of the engine cylinder), and directly into the exhausts passage 317 in order to achieve an amount of unburnt H2 of at least 0.2 mol % in the engine exhausts. As also shown in FIG. 3B, the secondary fuel injector 406 may alternatively be positioned at the engine outlet 17, which is indicated by the dashed box 406. The engine outlet 17 is e.g. a common outlet for a plurality of engine cylinders prior to that the engine exhausts are transferred to the EATS 20. Other positions of the secondary fuel injector 406 are conceivable, e.g. somewhere between downstream of the exhaust valve 318 of at least one of the engine cylinder 310, and upstream of the exhaust gas inlet 22 (shown in FIG. 2). As a further alternative embodiment, not disclosed in FIG. 3B, the secondary fuel injector is arranged and configured to inject the secondary H2 injection into the engine cylinder 310.

Preferably, both the primary and secondary fuel injectors 403, 406 are part of the injection system 420', and are configured to supply H2 from the H2 storage tank 405.

Turning back to FIG. 4. In a step S33, the hydrogen combustion engine 15 is operated by injecting water in the engine cylinder 310 during an intake stroke of the piston 312. This is typically achieved by the previously mentioned water inlet arrangement 404.

In a step S34, the amount of unburnt H2 is changed in the H2 exhaust excess mode from a lowest level of 0.2 mol % to a lowest level of 0.5 mol %. This may e.g. be performed in response to an increase in the torque demand of the hydrogen combustion engine 15, or in response to that the amount of NOx in the engine exhausts exceeds a NOx threshold value.

As shown in FIG. 4, the steps S31, S32, S33 and S34 may be sub-steps to the step S30 of operating the hydrogen combustion engine in the H2 exhaust excess mode. That is, steps S31, S32, S33 and S34 may be performed during operation of the hydrogen combustion engine 15 in the H2 exhaust excess mode.

In a step S36, the unburnt H2 is transported from the engine outlet 17 of the hydrogen combustion engine 15 to the ASC 50. The transportation is preferably carried out such that the mol fraction of the H2 in the exhaust gases reaching the ASC is at least 80% of that at the engine outlet.

As previously mentioned, the ASC 50 preferably comprises an oxidation catalyst and metal-zeolite. Thus, the step S40 of using the unburnt H2 in the engine exhausts as a reductant for NOx conversion in the ASC 50 may comprise the sub-step S40a of converting ammonia to NOx in the ASC 50 using the oxidation catalyst; and the sub-step S40b of converting NOx to N2 in the ASC using the metal-zeolite.

As also shown in FIG. 4, in response of an outcome of step S27 being that the temperature of the SCR catalyst 40 is above the predetermined SCR temperature threshold value, and/or that the temperature of the ASC 50 is above the predetermined ASC temperature threshold value, the hydrogen combustion engine 15 is operated in a default (or normal) combustion mode in a step S50. During such default combustion mode, only the previously primary H2 injection is utilized, and not the secondary H2 injection. The default combustion mode in S50 is typically corresponding to a four stroke cycle.

It should be noted that the SCR catalyst 40, the ASC 50 and the particulate filter 60 may be housed in separate containers or canisters.

It is to be understood that the present invention is not limited to the embodiments described above and illustrated in the drawings; rather, the skilled person will recognize that many changes and modifications may be made within the scope of the appended claims. For example, the EATS may be used for cleaning exhaust gases of other engines than hydrogen combustion engines, e.g. in a dual-fuel engine system (in which one of the engines is a hydrogen combustion engine). For example, the present EATS may be used to clean exhaust gases, e.g. by converting NOx emissions, from the exhaust of internal combustion engines based on H2 (Hydrogen) or a mix of H2 and natural gas.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for controlling the operation of a hydrogen combustion engine system of a vehicle, the hydrogen combustion engine system comprising a hydrogen combustion engine and an exhaust aftertreatment system, EATS, configured to reduce emissions in the engine exhausts, the EATS comprising a selective catalyst reduction, SCR, catalyst and an ammonia slip catalyst, ASC, arranged downstream of the SCR catalyst, wherein the method comprises:
    determining the temperature of the SCR catalyst;
    determining the temperature of the ASC; and
    in response of determining that the temperature of the SCR catalyst is below a predetermined SCR temperature threshold value, and that the temperature of the ASC is below a predetermined ASC temperature threshold value, operating the hydrogen combustion engine in an H2 exhaust excess mode defined by an amount of unburnt H2 of at least 0.2 mol % in the engine exhausts, and using the unburnt H2 in the engine exhausts as a reductant for NOx conversion in the ASC.

2. The method according to claim 1, wherein the H2 exhaust excess mode comprises operating the hydrogen combustion engine by injecting H2 in the engine cylinder during an exhaust stroke.

3. The method according to claim 1, wherein the H2 exhaust excess mode is defined by an amount of unburnt H2 of at least 0.5 mol % in the engine exhausts.

4. The method according to claim 1, wherein the H2 exhaust excess mode comprises operating the hydrogen combustion engine by injecting H2 in the engine cylinder during a compression stroke to reach a target lambda.

5. The method according to claim 1, wherein the H2 exhaust excess mode comprises operating the hydrogen combustion engine by injecting water in the engine cylinder during an intake stroke.

6. The method according to claim 1, further comprising:
    transporting the unburnt H2 from an engine outlet of the hydrogen combustion engine to the ASC such that the mol fraction of the H2 in the exhaust gases reaching the ASC is at least 80% of that at the engine outlet.

7. The method according to claim 1, wherein the ASC is a monolith catalyst comprising an oxidation catalyst and a metal-zeolite coating, and the method comprises:
converting ammonia to NOx in the ASC using the oxidation catalyst; and
converting NOx to N2 in the ASC using the metal-zeolite.

8. The method according to claim 1, wherein the method is performed during a cold start of the hydrogen combustion engine.

9. A non-transitory computer readable medium carrying a computer program comprising program code comprising instructions to cause a hydrogen combustion engine system to execute the steps of the method of claim 1 when said computer program is run on a computer.

10. A hydrogen combustion engine system for a vehicle, the hydrogen combustion engine system comprising a hydrogen combustion engine and an exhaust aftertreatment system, EATS, configured to reduce emissions in the engine exhausts, the EATS comprising a selective catalyst reduction, SCR, catalyst and an ammonia slip catalyst, ASC, arranged downstream of the SCR catalyst, wherein the hydrogen combustion engine system comprises a control unit configured to:
determine the temperature of the SCR catalyst;
determine the temperature of the ASC;
in response of determining that the temperature of the SCR catalyst is below a predetermined SCR temperature threshold value, and that the temperature of the ASC is below a predetermined ASC temperature threshold value, instruct the hydrogen combustion engine to operate in an H2 exhaust excess mode defined by an amount of unburnt H2 of at least 0.2 mol % in the engine exhausts for using the unburnt H2 in the engine exhausts as a reductant for NOx conversion in the ASC.

11. The hydrogen combustion engine system according to claim 10, wherein the EATS is free of any oxidation catalyst arranged downstream of an exhaust gas inlet of the EATS and upstream of the ASC.

12. A vehicle comprising a hydrogen combustion engine system according to claim 10.

* * * * *